United States Patent
Kuo et al.

(10) Patent No.: US 7,788,438 B2
(45) Date of Patent: Aug. 31, 2010

(54) MULTI-INPUT/OUTPUT SERIAL PERIPHERAL INTERFACE AND METHOD FOR DATA TRANSMISSION

(75) Inventors: Yu-Lan Kuo, Hsinchu (TW); Chun-Hsiung Hung, Hsinchu (TW)

(73) Assignee: Macronix International Co., Ltd., Hsinchu (TW)

( * ) Notice: Subject to any disclaimer, the term of this patent is extended or adjusted under 35 U.S.C. 154(b) by 292 days.

(21) Appl. No.: 11/896,846

(22) Filed: Sep. 6, 2007

(65) Prior Publication Data

US 2008/0091848 A1 Apr. 17, 2008

Related U.S. Application Data

(60) Provisional application No. 60/851,312, filed on Oct. 13, 2006, provisional application No. 60/855,397, filed on Oct. 31, 2006, provisional application No. 60/856,308, filed on Nov. 3, 2006.

(51) Int. Cl.
*G06F 13/14* (2006.01)
*G06F 3/00* (2006.01)
*G06F 5/00* (2006.01)
*G06F 13/00* (2006.01)
*G06F 13/42* (2006.01)

(52) U.S. Cl. .................. 710/305; 710/3; 710/4; 710/6; 710/59; 710/100; 710/105

(58) Field of Classification Search ........... 710/3, 710/4, 6, 59, 100, 105, 305
See application file for complete search history.

(56) References Cited

U.S. PATENT DOCUMENTS 4,808,802 A * 2/1989 Kano .................. 235/380
4,897,819 A * 1/1990 Takizawa ............ 365/230.06
5,031,209 A * 7/1991 Thornborough et al. ............ 379/106.03
5,097,118 A * 3/1992 Iijima ................. 235/492

(Continued)

FOREIGN PATENT DOCUMENTS

JP          01088760 A     *   4/1989

(Continued)

OTHER PUBLICATIONS

FM25C160U 16K-Bit SPI Interface Serial CMOS EEPROM Datasheet, Feb. 2002, Fairchild Semiconductor Corporation, Rev. B, pp. 3, 6, and 7.*

(Continued)

*Primary Examiner*—Mark Rinehart
*Assistant Examiner*—Faisal M Zaman
(74) *Attorney, Agent, or Firm*—Rabin & Berdo, P.C.

(57) ABSTRACT

A multi-input/output serial peripheral interface of an integrated circuit includes many pins coupled to the integrated circuit. The integrated circuit receives an instruction under a control of selectively using only a first pin or a combination of the first pin, a second pin, a third pin, and a fourth pin of the multi-input/output serial peripheral interface. The integrated circuit receives an address using the first pin, the second pin, the third pin, and the fourth pin of the multi-input/output serial peripheral interface. The integrated circuit sends a read out data using the first pin, the second pin, the third pin, and the fourth pin of the multi-input/output serial peripheral interface.

18 Claims, 6 Drawing Sheets

U.S. PATENT DOCUMENTS

| | | | | |
|---|---|---|---|---|
| 5,515,514 | A | * | 5/1996 | Dhuey et al. ................. 710/301 |
| 5,579,251 | A | * | 11/1996 | Sato ............................ 702/117 |
| 5,764,081 | A | * | 6/1998 | Fant et al. ..................... 326/63 |
| 6,157,567 | A | * | 12/2000 | Kuo et al. .............. 365/185.04 |
| 6,625,065 | B2 | * | 9/2003 | Gall et al. ................... 365/120 |
| 6,711,073 | B2 | * | 3/2004 | Martin ....................... 365/198 |
| 6,998,871 | B2 | * | 2/2006 | Mulligan ..................... 326/37 |
| 7,159,069 | B2 | * | 1/2007 | Adusumilli et al. ......... 711/103 |
| 7,378,873 | B1 | * | 5/2008 | Tang et al. .................... 326/41 |
| 7,558,900 | B2 | * | 7/2009 | Jigour et al. ................ 710/305 |
| 2003/0097502 | A1 | * | 5/2003 | Bacigalupo ................. 710/100 |
| 2006/0067123 | A1 | | 3/2006 | Jigour et al. |
| 2008/0005434 | A1 | * | 1/2008 | Lee et al. .................... 710/110 |
| 2008/0059768 | A1 | * | 3/2008 | Hung et al. ................... 712/43 |

FOREIGN PATENT DOCUMENTS

| | | | | |
|---|---|---|---|---|
| JP | 02308492 | A | * | 12/1990 |
| JP | 03102473 | A | * | 4/1991 |
| JP | 04052962 | A | * | 2/1992 |
| JP | 05094299 | A | * | 4/1993 |
| JP | 11154395 | A | * | 6/1999 |

OTHER PUBLICATIONS

Yabin et al., "Design and Implementation of the Configuration Circuit for FDP FPGA," Dec. 3, 2008, IEEE, IEEE Asia Pacific Conference on Circuits and Systems, pp. 696-700.*

Melear, C., "Intelligent Peripheral Modules for Microcontrollers," Mar. 9, 1995, IEEE, Southcon/95 Conference Record, pp. 90-99.*

Szekacs et al., "Realising the SPI Communication in a Multiprocessor System," Aug. 25, 2007, IEEE, 5th International Symposium on Intelligent Systems and Informatics, pp. 213-216.*

Zhang et al., "A Highly Programmable Sensor Network Interface with Multiple Sensor Readout Circuits," Oct. 24, 2003, IEEE, vol. 3, Proceedings of IEEE Sensors, pp. 748-752.*

* cited by examiner

FIG. 5

MULTI-INPUT/OUTPUT SERIAL PERIPHERAL INTERFACE AND METHOD FOR DATA TRANSMISSION

This application claims the benefits of U.S. provisional application Ser. No. 60/851,312, filed Oct. 13, 2006, Ser. No. 60/855,397, filed Oct. 31, 2006 and Ser. No. 60/856,308, filed Nov. 3, 2006, the subject matter of which is incorporated herein by reference.

BACKGROUND OF THE INVENTION

1. Field of the Invention

The invention relates in general to a multi-input/output serial peripheral interface and a data transmitting method thereof, and more particularly to a multi-input/output serial peripheral interface having a better overall behavior and a data transmitting method thereof.

2. Description of the Related Art

Figure 1:
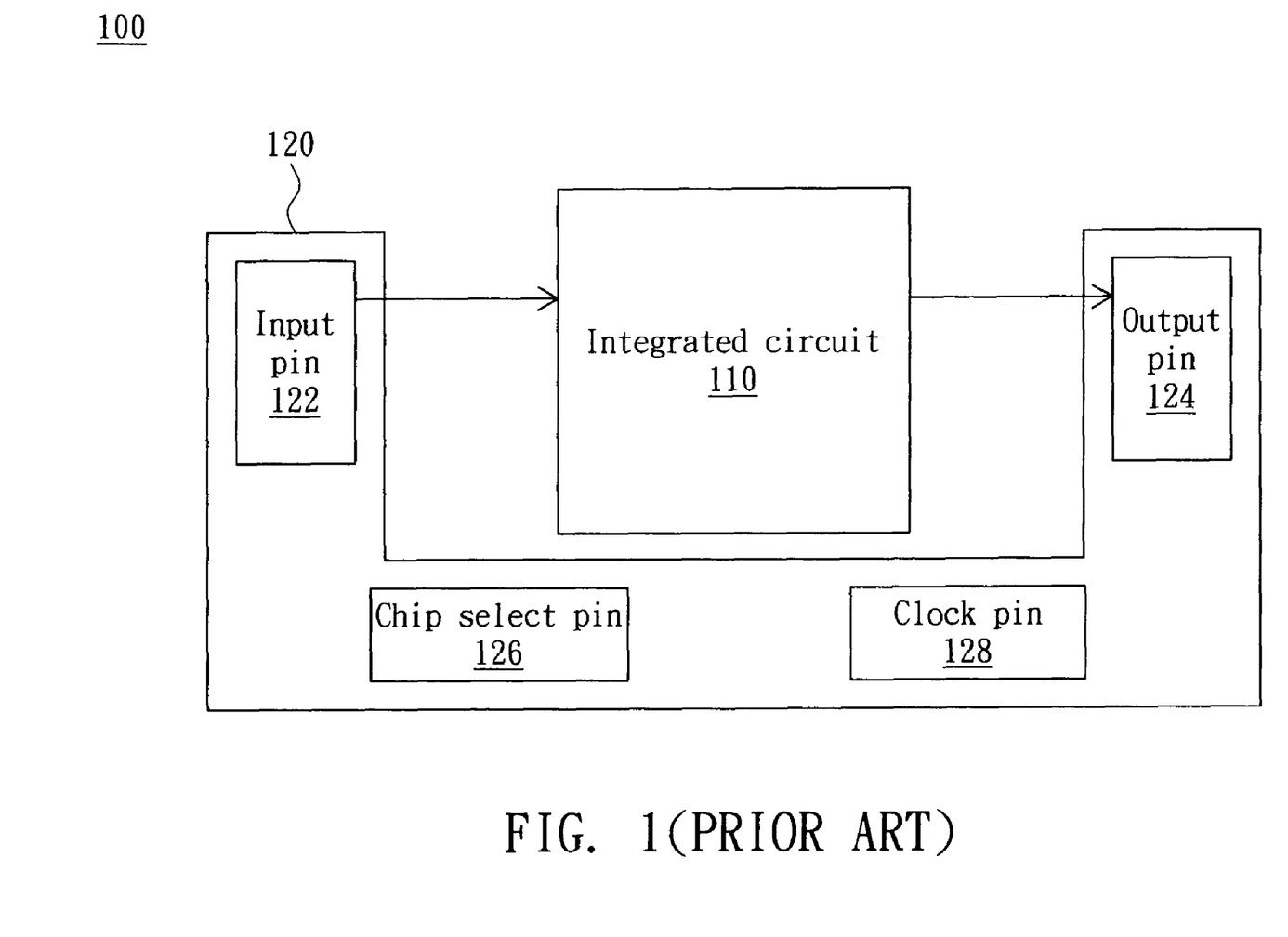
FIG. 1 (Prior Art) is a block diagram showing a conventional data transmission system.

FIG. 1 (Prior Art) is a block diagram showing a conventional data transmission system. Referring to FIG. 1, the data transmission system 100 includes an integrated circuit 110 and a serial peripheral interface 120. The serial peripheral interface 120 has many pins, for example, including an input pin 122, an output pin 124, a chip select pin 126 and a clock pin 128. The input pin 122 receives a piece of serial data, including instructions and addresses, and transmits the piece of serial data to the integrated circuit 110. The output pin 124 reads a piece of serial data, including dummy cycles and multiple read out data, from the integrated circuit 110 and outputs the piece of serial data. The chip select pin 126 provides a chip select signal CS, and the clock pin 128 provides a clock signal SCLK.

Figure 2:
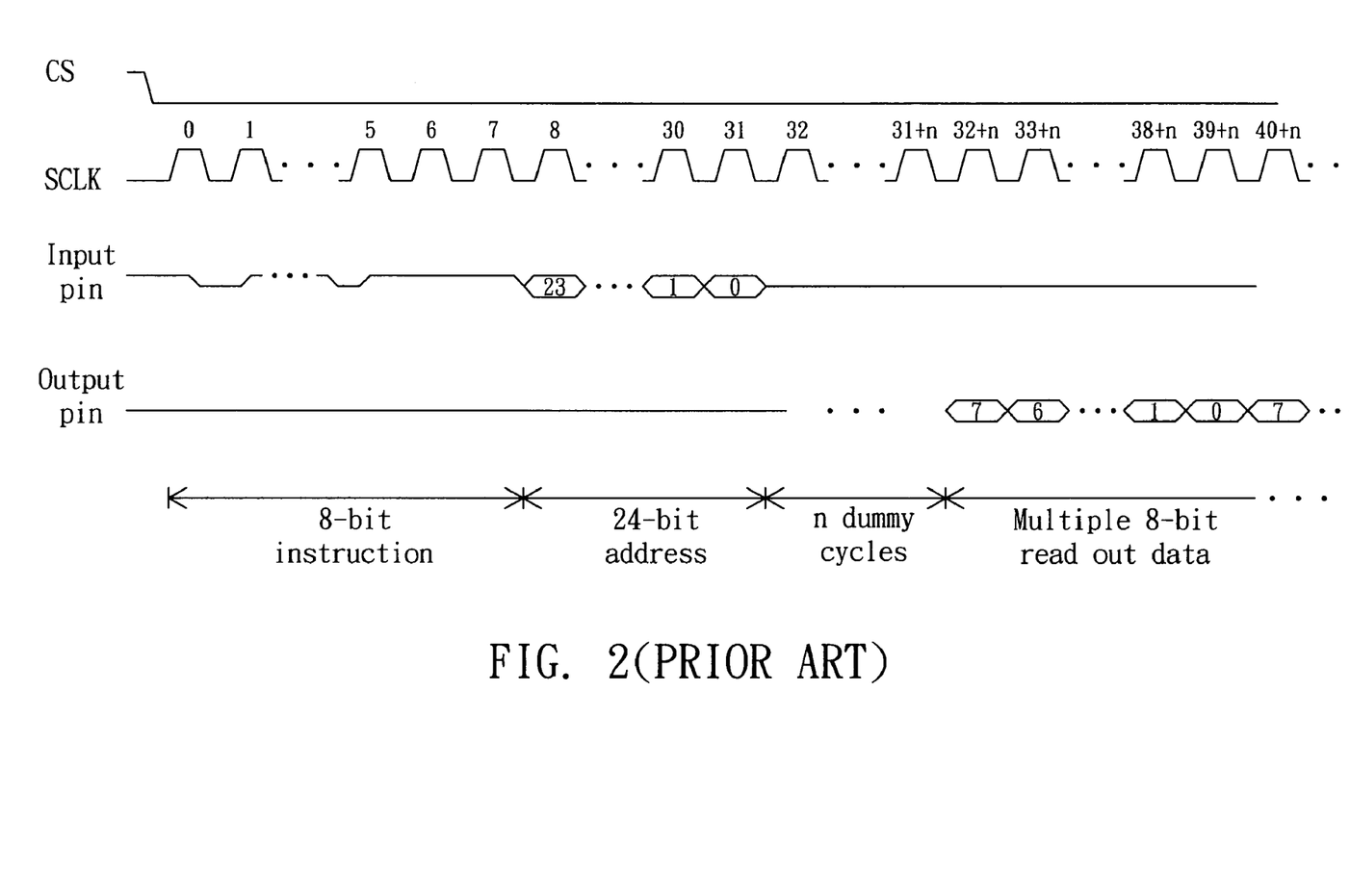
FIG. 2 (Prior Art) shows timings for reading serial data in the conventional data transmission system.

FIG. 2 (Prior Art) shows timings for reading serial data in the conventional data transmission system. As shown in FIG. 2, for example, the piece of serial data includes an 8-bit instruction, a 24-bit address, n dummy cycles and multiple 8-bit read out data, wherein n is an integer greater than or equal to 0 and is not particularly limited. It can be determined according to the design of data transmission system 100. As shown in FIG. 2, when the chip select signal CS is low, the clock signal SCLK has many timing pulses. At this time, the input pin first receives the 8-bit instruction, and then receives the 24-bit address, which is the initial address of the data to be read. Then, n dummy cycles are provided for buffering. Next, the output pin reads and outputs the multiple 8-bit read out data.

The data transmission system 100 utilizes one single input pin and one single output pin of the serial peripheral interface 120 to perform the serial data transmitting operation. Consequently, only one bit of data is transmitted in one timing pulse, and the efficiency is not high. So, the overall behavior of the data transmission system 100 cannot be optimized.

SUMMARY OF THE INVENTION

The invention is directed to a multi-input/output serial peripheral interface and a data transmitting method thereof, in which many control pins of the multi-input/output serial peripheral interface are utilized to achieve a serial data transmission through multiple input pins and multiple output pins, and enhance the overall behavior of data transmission.

According to a first aspect of the present invention, a multi-input/output serial peripheral interface of an integrated is provided. The multi-input/output serial peripheral interface includes many pins coupled to the integrated circuit. The integrated circuit receives an instruction under a control of selectively using only a first pin or a combination of the first pin, a second pin, a third pin, and a fourth pin of the multi-input/output serial peripheral interface. The integrated circuit receives an address using the first pin, the second pin, the third pin, and the fourth pin of the multi-input/output serial peripheral interface. The integrated circuit sends a read out data using the first pin, the second pin, the third pin, and the fourth pin of the multi-input/output serial peripheral interface.

According to a second aspect of the present invention, a data transmitting method applied to a multi-input/output serial peripheral interface of an integrated circuit is provided. The multi-input/output serial peripheral interface includes many pins including a first pin and a second pin. The data transmitting method includes the steps of: receiving an instruction by the integrated circuit under a control of selectively using only the first pin or a combination of the first pin, the second pin, a third pin, and a fourth pin of the multi-input/output serial peripheral interface; receiving an address by the integrated circuit using the first pin, the second pin, the third pin, and the fourth pin of the multi-input/output serial peripheral interface; sending a read out data by the integrated circuit using the first pin, the second pin, the third pin, and the fourth pin of the multi-input/output serial peripheral interface; temporarily stopping transmitting the read out data through the first pin when the first pin is not for transmitting the instruction, the address or the read out data; and preventing the read out data from being read form the integrated circuit through the second pin when the second pin is not for transmitting the instruction, the address or the read out data.

The invention will become apparent from the following detailed description of the preferred but non-limiting embodiments. The following description is made with reference to the accompanying drawings.

DETAILED DESCRIPTION OF THE INVENTION

The invention provides a multi-input/output serial peripheral interface and a data transmitting method thereof, in which many control pins of the multi-input/output serial peripheral interface are utilized to achieve the serial data transmission through multiple input pins and multiple output pins, and enhance the overall behavior of data transmission.

Figure 3:
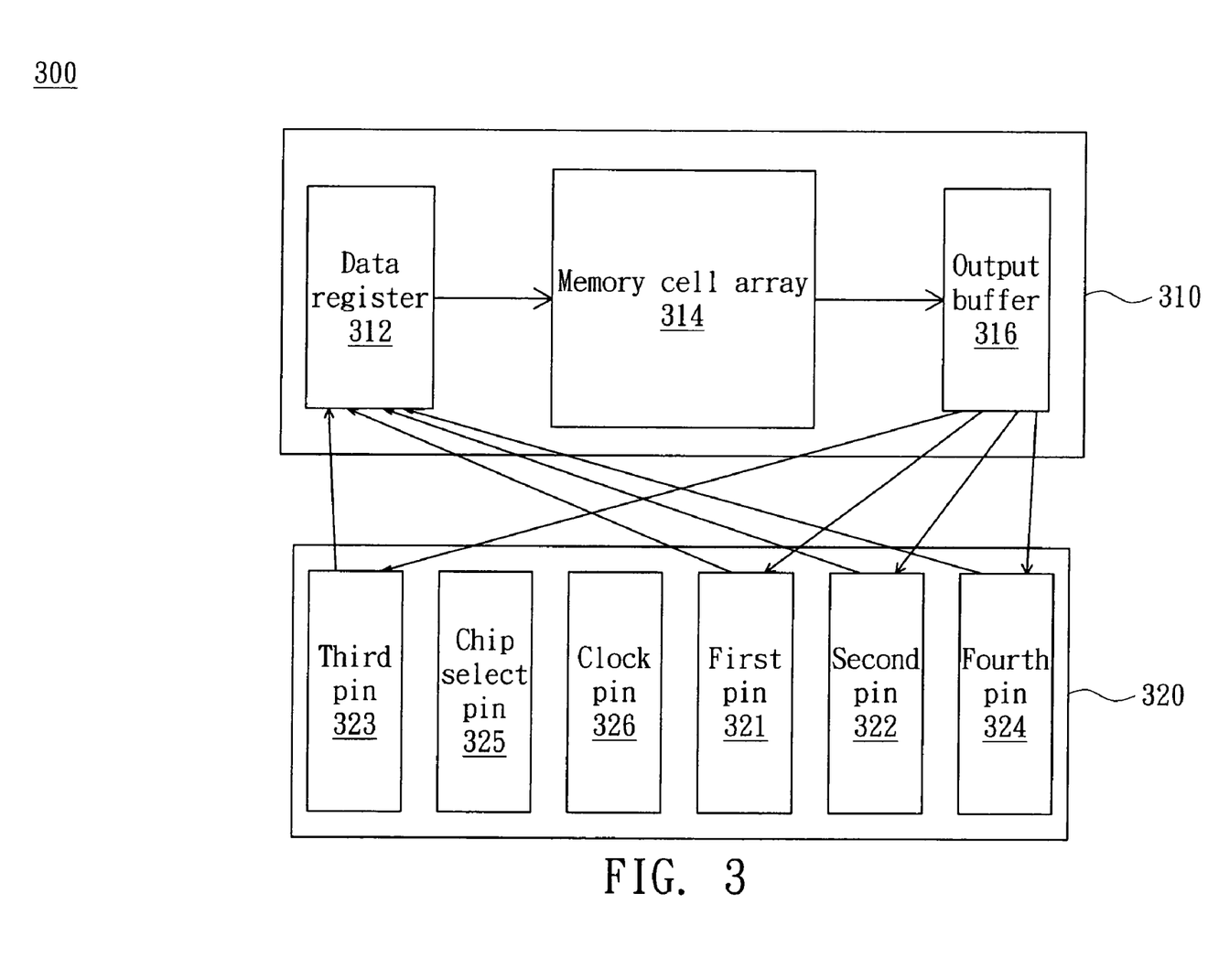
FIG. 3 is a block diagram showing an example of a data transmission system according to a preferred embodiment of the invention.

FIG. 3 is a block diagram showing an example of a data transmission system 300 according to a preferred embodiment of the invention. Referring to FIG. 3, the data transmission system 300 includes a integrated circuit 310 and a multi-input/output serial peripheral interface 320. Take the integrated circuit 310 be a memory device as exemplified, but is not limited. The integrated circuit 310 may be any circuit having a function of storing data. When the integrated circuit 310 is the memory device, the integrated circuit 310 includes a data register 312, a memory cell array 314 and an output buffer 316. The memory cell array 314 stores data.

The multi-input/output serial peripheral interface 320 has many pins 321 to 324 which are coupled to the integrated circuit 310. The integrated circuit 300 receives an instruction using only the first pin 321 or the first pin 321, the second pin 322, the third pin 323, and the fourth pin 324 of the multi-input/output serial peripheral interface 320. The integrated circuit receives 300 an address using the first pin 321, the second pin 322, the third pin 323, and the fourth pin 324 of the multi-input/output serial peripheral interface 320. The instruction and the address are transmitted to the data register 312, temporarily stored in the data register 312, and then transmitted to the memory cell array 314.

When a read out data is read from the integrated circuit 310 (i.e., when the read out data is to be read from the memory cell array 314), the read out data is transmitted to the output buffer 316 from the memory cell array 314, and temporarily stored in the output buffer 316. Then the read out data is sent through the first pin 321, the second pin 322, the third pin 323, and the fourth pin 324 of the multi-input/output serial peripheral interface 320. There may exist multiple dummy cycles before the read out data is sent.

The multiple pins of the multi-input/output serial peripheral interface 320 substantially include the first pin 321 and the second pin 322. When the first pin 321 is not for transmitting the instruction, the address or the read out data, the first pin 321 is used to temporarily stop transmitting the read out data. When the second pin 322 is not for transmitting the instruction, the address or the read out data, the second pin 322 can prevent the read out data from being read from the memory cell array 314. The first pin 321 and the second pin 322 substantially pertain to the control pins in the conventional serial peripheral interface, and are utilized to achieve the transmission of a piece of serial data, including instructions, addresses, dummy cycles and multiple read out data, through multiple input pins and multiple output pins in this embodiment.

The multi-input/output serial peripheral interface 320 further includes a chip select pin 325 for outputting a chip select signal CS. When the voltage level of the chip select signal CS is low, the first pin 321 to the fourth pin 324 transmit the instruction, the address or the read out data. In addition, the multi-input/output serial peripheral interface 320 also includes a clock pin 326 for inputting a timing signal SCLK, and the first pin 321 to the fourth pin 324 transmit the instruction, the address or the read out data according to the timing signal. It is possible to utilize the first pin 321 to the fourth pin 324 to simultaneously transmit the instruction, the address or the read out data, or to utilize some of the first pin 321 to the fourth pin 324 to simultaneously transmit the instruction, the address or the read out data. Compared with the conventional serial peripheral interface, the multi-input/output serial peripheral interface 300 according to the embodiment of the invention can increase the overall data transmission rate at most three times.

The timing signal SCLK includes many timing pulses. The first pin 321 to the fourth pin 324 transmit data according to the timing pulses. In addition, the first pin 321 to the fourth pin 324 may also transmit the data at rising edges, falling edges or both of the timing pulses. That is, a selection of the function of the double data rate (DDR) is provided.

Figure 4A:
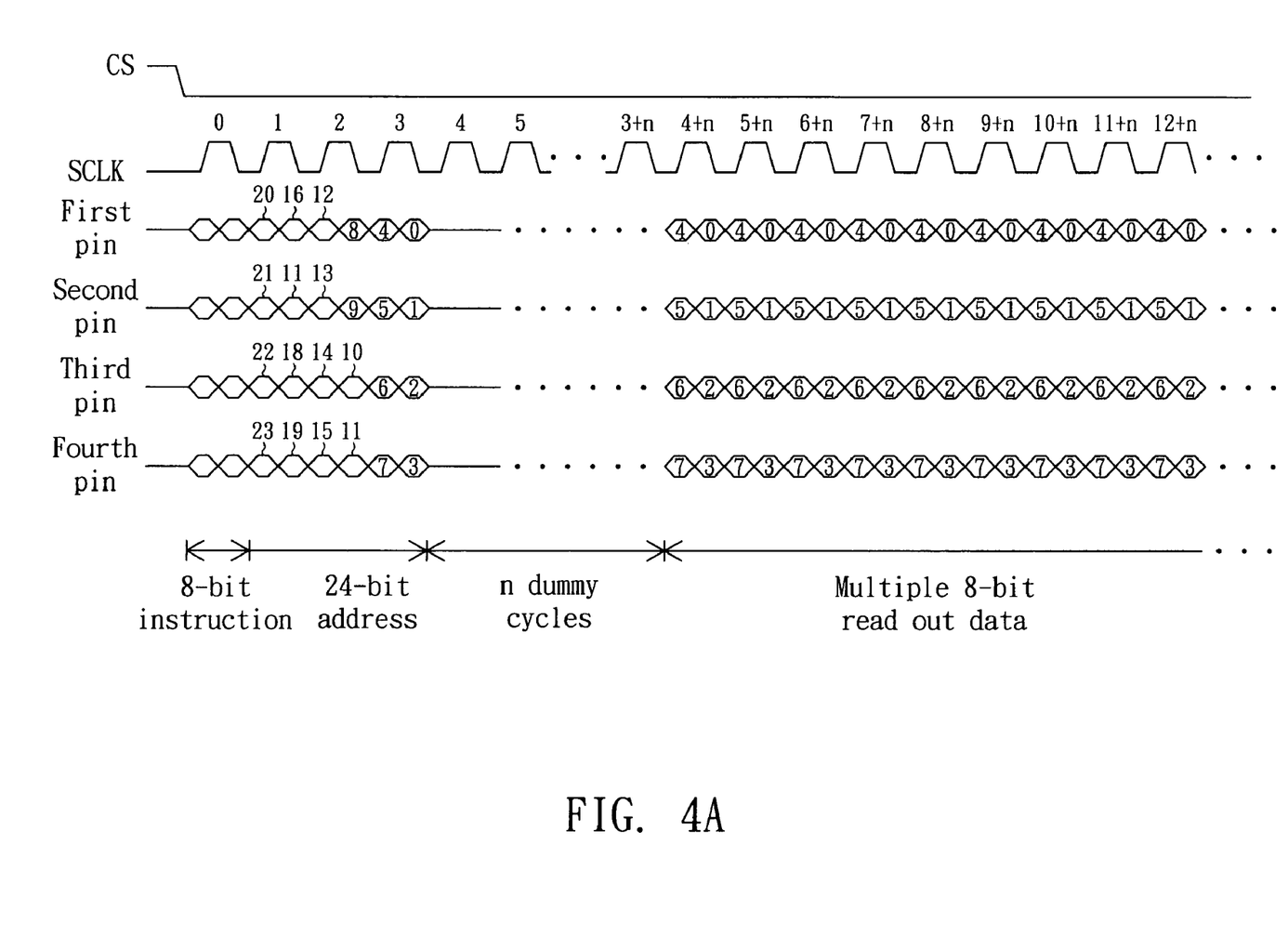
FIG. 4A shows timings of serial data according to a first embodiment of the invention.

FIG. 4A shows timings of serial data according to a first embodiment of the invention. As shown in FIG. 4A, for example, the serial data includes an 8-bit instruction, a 24-bit address, n dummy cycles and multiple 8-bit read out data, wherein n is an integer greater than or equal to 0 and is not particularly restricted. In FIG. 4A, when the chip select signal CS is low, the timing signal SCLK has many timing pulses. The first pin 321 to the fourth pin 324 receive the serial data at the rising edges and the falling edges of the timing pulses.

The first pin 321 to the fourth pin 324 receive the 8-bit instruction at the timing pulse 0, and then receive the 24-bit address at the timing pulses 1 to 3, wherein this address is the initial address of the data to be read. Then, n dummy cycles are provided for buffering. Next, the multiple 8-bit read out data are read and outputted after the timing pulse n+3. Compared with the conventional serial peripheral interface, the data transmission rate of the first embodiment of the invention may be increased seven times. In FIG. 4A, the transmission of all of the instruction, the address, the dummy cycles and the read out data is made according to the function of the double data rate. However, the transmission of the instruction, the address, the dummy cycles or the read out data may be also individually made according to the function of the double data rate or not. For example, only the transmission of the read out data is made according to, without limitation to, the function of the double data rate.

Figure 4B:
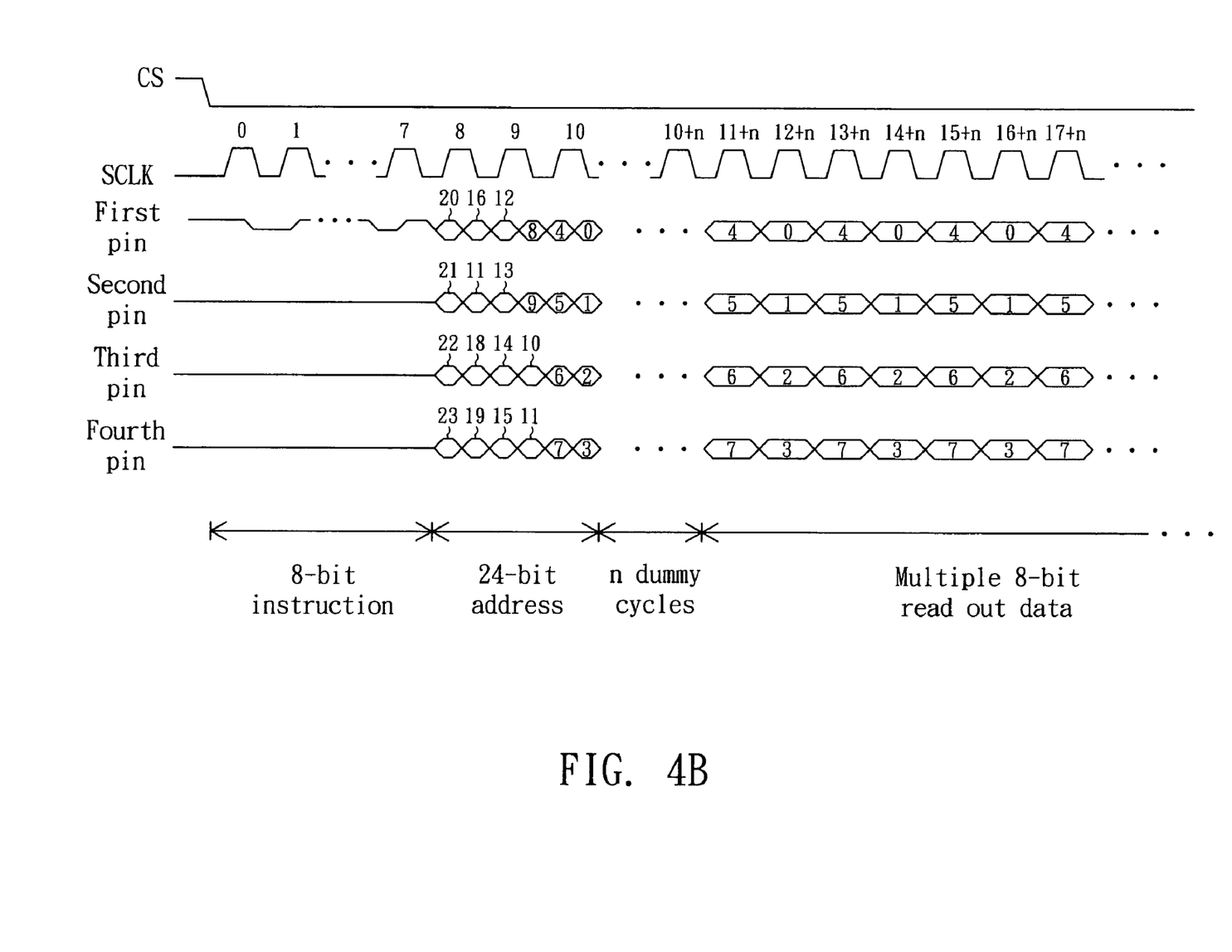
FIG. 4B shows timings of serial data according to a second embodiment of the invention.

FIG. 4B shows timings of serial data according to a second embodiment of the invention. As shown in FIG. 4B, the first pin 321 receives the 8-bit instruction at the timing pulse 0 to 7. Then the first pin 321 to the fourth pin 324 receive the 24-bit address at the timing pulses 8 to 10. Then, n dummy cycles are provided for buffering. Next, the multiple 8-bit read out data are read and outputted after the timing pulse n+10. The 8-bit instruction is received only by the first pin 321. The 24-bit address is received by the function of double data rate. The multiple 8-bit read out data are received without the function of double data rate. In the invention, whether the transmission of the instruction, the address, the dummy cycles or the read out data applies the function of double data rate is decided according to the practical requirement and not limited hereinabove.

Figure 5:
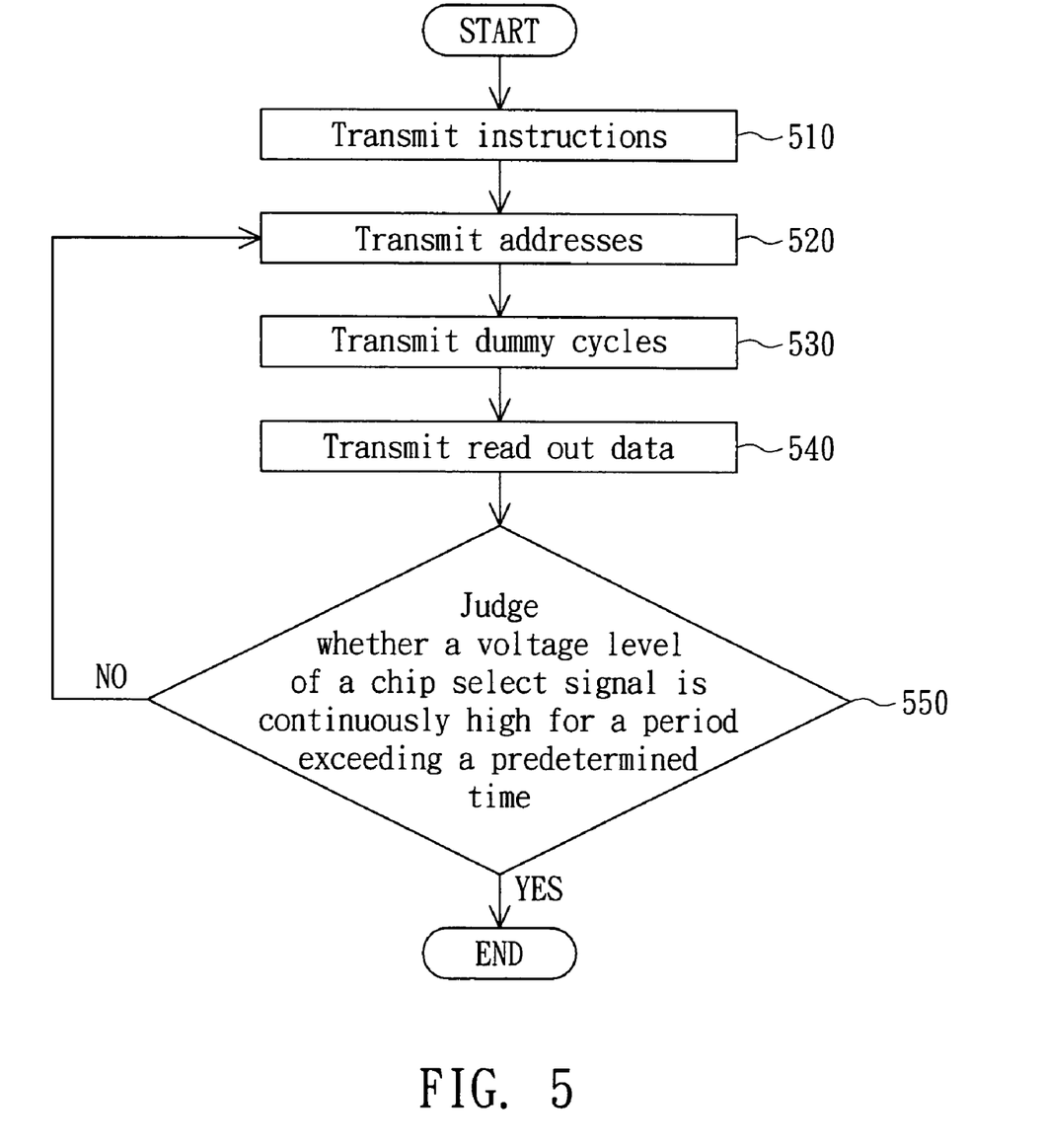
FIG. 5 is a flow chart showing a method for transmitting random data according to the preferred embodiment of the invention.

The data transmitting method mentioned hereinabove is performed to transmit the continuous data. If the random data has to be transmitted, it is necessary to make a judgement according to the time, for which the voltage level of the chip select signal CS is kept high. FIG. 5 is a flow chart showing a method for transmitting random data according to the preferred embodiment of the invention. First, the instruction, the address, the dummy cycles and the read out data are sequentially transmitted in steps 510 to 540. Then, step 550 judges whether the voltage level of the chip select signal is continuously kept high for a period exceeding a predetermined time, such as 240 nanoseconds (ns). If the voltage level of the chip select signal is continuously kept high for a period not exceeding the predetermined time, it represents that the instruction is a random access instruction. So, the procedure goes back to step 520, and the address, the dummy cycles and the read out data are transmitted again. If the voltage level of the chip select signal is continuously kept high for a period exceeding the predetermined time, it represents that the data transmission ends.

The multi-input/output serial peripheral interface and the data transmitting method according to the embodiment of the invention utilize many control pins on the multi-input/output serial peripheral interface to perform the data transmitting operation with the integrated circuit. The integrated circuit may be any type circuit with the function of data storage. Consequently, the serial data transmission can be through the multiple input pins and the multiple output pins, and the overall performance of data transmission can be enhanced.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A multi-input/output serial peripheral interface of an integrated circuit, the multi-input/output serial peripheral interface comprising:
   a plurality of pins couple to the integrated circuit, wherein:
      the integrated circuit receives an instruction under a control of selectively using only a first pin or a combination of the first pin, a second pin, a third pin, and a fourth pin of the multi-input/output serial peripheral interface, and
      the integrated circuit receives an address using the first pin, the second pin, the third pin, and the fourth pin of the multi-input/output serial peripheral interface, and
      the integrated circuit sends a read out data using the first pin, the second pin, the third pin, and the fourth pin of the multi-input/output serial peripheral interface,
   wherein the second pin is for preventing the read out data from being read from the integrated circuit, and transmitting the instruction, the address or the read out data when the second pin is not for preventing the read out data from being read from the integrated circuit.

2. The multi-input/output serial peripheral interface according to claim 1, wherein the first pin is for temporarily stopping transmitting the read out data, and transmitting the instruction, the address or the read out data when the first pin is not for temporarily stopping transmitting the read out data.

3. The multi-input/output serial peripheral interface according to claim 2, wherein the integrated circuit is a memory device which comprises:
   a memory cell array for storing the read out data;
   a data register, wherein the instruction and the address are transmitted to the data register through at least part of the pins and temporarily stored in the data register, and then transmitted to the memory cell array; and
   an output buffer, wherein the read out data is transmitted from the memory cell array to the output buffer and temporarily stored in the output buffer, and then transmitted to at least part of the pins, and the multi-input/output serial peripheral interface outputs the read out data.

4. The multi-input/output serial peripheral interface according to claim 3, wherein both of the first pin and the second pin are coupled to the data register and the output buffer.

5. A data transmitting method applied to a multi-input/output serial peripheral interface of an integrated circuit, the multi-input/output serial peripheral interface including a plurality of pins comprising a first pin and a second pin, the method comprising the steps of:
   receiving an instruction by the integrated circuit under a control of selectively using only the first pin or a combination of the first pin, the second pin, a third pin, and a fourth pin of the multi-input/output serial peripheral interface;
   receiving an address by the integrated circuit using the first pin, the second pin, the third pin, and the fourth pin of the multi-input/output serial peripheral interface;
   sending a read out data by the integrated circuit using the first pin, the second pin, the third pin, and the fourth pin of the multi-input/output serial peripheral interface;
   temporarily stopping transmitting the read out data through the first pin when the first pin is not for transmitting the instruction, the address or the read out data; and
   preventing the read out data from being read from the integrated circuit through the second pin when the second pin is not for transmitting the instruction, the address or the read out data.

6. The method according to claim 5, wherein the integrated circuit is a memory device, and the memory device comprises a memory cell array, a data register and an output buffer, and the method further comprises the steps of:
   transmitting the instruction and the address to the data register through at least part of the pins and temporarily storing the instruction and the address in the data register, and then transmitting the instruction and the address to the memory cell array when the instruction and the address is received by the integrated circuit; and
   transmitting the read out data from the memory cell array to the output buffer, and temporarily storing the read out data into the output buffer, then transmitting the read out data to at least part of the pins, and outputting the read out data through the multi-input/output serial peripheral interface when the read out data is read from the integrated circuit.

7. The method according to claim 6, wherein both of the first pin and the second pin are coupled to the data register and the output buffer.

8. The method according to claim 7, wherein the multi-input/output serial peripheral interface further comprises a chip select pin for inputting a chip select signal, and at least part of the pins transmit the instruction, the address or the read out data when a voltage level of the chip select signal is low.

9. The method according to claim 8, wherein the multi-input/output serial peripheral interface further comprises a clock pin for inputting a timing signal, and the pins transmit the instruction, the address or the read out data according to the timing signal.

10. The method according to claim 9, wherein the timing signal comprises a plurality of timing pulses.

11. The method according to claim 10, wherein the pins transmit the instruction according to the timing pulses.

12. The method according to claim 11, wherein the pins transmit the instruction at rising edges, falling edges or both edges of the timing pulses.

13. The method according to claim 10, wherein the pins transmit the address according to the timing pulses.

14. The method according to claim 13, wherein the pins transmit the address at rising edges, falling edges or both edges of the timing pulses.

15. The method according to claim 10, wherein the pins transmit the read out data according to the timing pulses.

16. The method according to claim 15, wherein the pins transmit the read out data at rising edges, falling edges or both edges of the timing pulses.

17. The method according to claim 10, wherein when the read out data is read from the integrated circuit and if a voltage level of the chip select signal is continuously high for a period not exceeding a predetermined time, the pins transmit a new address, a new dummy cycle and a new read out data.

18. The method according to claim 17, further comprising the step of:
   stopping reading the read out data from the memory device if the voltage level of the chip select signal is continuously high for another period exceeding the predetermined time.

* * * * *